United States Patent
Mu et al.

(10) Patent No.: US 11,623,883 B2
(45) Date of Patent: Apr. 11, 2023

(54) FAUCET CONFIGURED TO DISCHARGE OZONE WATER

(71) Applicant: Xiamen Solex High-Tech Industries Co., Ltd., Xiamen (CN)

(72) Inventors: Weihai Mu, Xiamen (CN); Chunjie Hong, Xiamen (CN); Canhui Zhu, Xiamen (CN); Wenxing Chen, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 134 days.

(21) Appl. No.: 16/970,105

(22) PCT Filed: Jan. 7, 2019

(86) PCT No.: PCT/CN2019/070650
§ 371 (c)(1),
(2) Date: Aug. 14, 2020

(87) PCT Pub. No.: WO2019/137335
PCT Pub. Date: Jul. 18, 2019

(65) Prior Publication Data
US 2021/0047213 A1    Feb. 18, 2021

(30) Foreign Application Priority Data

Jan. 10, 2018 (CN) .......................... 201810022535.7
Jan. 10, 2018 (CN) .......................... 201820040595.7

(51) Int. Cl.
*C02F 1/78* (2023.01)
*C02F 1/00* (2023.01)
(Continued)

(52) U.S. Cl.
CPC ................ *C02F 1/78* (2013.01); *C02F 1/008* (2013.01); *E03C 1/04* (2013.01); *F16K 11/0782* (2013.01);
(Continued)

(58) Field of Classification Search
CPC .... C02F 1/78; C02F 1/008; C02F 1/50; C02F 1/00; C02F 2201/005; C02F 2201/782;
(Continued)

(56) References Cited

U.S. PATENT DOCUMENTS

2014/0352799 A1* 12/2014 Rosko .................. C02F 1/78
137/237
2016/0355423 A1   12/2016 Liu et al.

FOREIGN PATENT DOCUMENTS

CN    205155248 U    4/2016
CN    205244469 U *  5/2016 .............. F16K 11/02
(Continued)

OTHER PUBLICATIONS

CN 205244469 U English description, May 2016, Zhuang Shilang.*
(Continued)

*Primary Examiner* — Akash K Varma
(74) *Attorney, Agent, or Firm* — Cooper Legal Group, LLC (57) ABSTRACT

A faucet configured to discharge ozone water comprises a faucet body, a water mixing valve mechanism, a water processor, a control switch, a processor, a control valve, and a detector configured to detect whether water is flowing through the detector. The faucet body comprises a faucet outlet, and the water mixing valve mechanism comprises a cold water inlet connected to a cold water resource, a hot water inlet connected to a hot water resource, and a mixed water outlet. The water processor comprises a water processing passage and an ozone generator connected to the
(Continued)

water processing passage. The control valve is disposed between the cold water resource and an inlet of the water processing passage, and an outlet of the water processing passage is connected to the faucet outlet. The detector is disposed between the mixed water outlet of the water mixing valve mechanism and the inlet of the water processing passage, and the processor is electrically connected to the control switch, the ozone generator, the detector, and the control valve to close the control valve and the ozone generator when the detector detects the water flowing through the detector.

13 Claims, 11 Drawing Sheets (51) Int. Cl.
*F16K 37/00* (2006.01)
*F16K 11/078* (2006.01)
*E03C 1/04* (2006.01)

(52) U.S. Cl.
CPC .... *F16K 37/0091* (2013.01); *C02F 2201/005* (2013.01); *C02F 2201/782* (2013.01); *C02F 2201/784* (2013.01); *C02F 2209/23* (2013.01); *C02F 2209/40* (2013.01); *C02F 2303/04* (2013.01); *C02F 2307/06* (2013.01)

(58) Field of Classification Search
CPC ............ C02F 2201/784; C02F 2209/23; C02F 2209/40; C02F 2303/04; C02F 2307/06; E03C 1/04; E03C 2201/40; F16K 11/0782; F16K 11/00; F16K 11/078; F16K 37/0091; F16K 37/00; F16K 27/00
USPC .......................................................... 210/85
See application file for complete search history.

(56) References Cited

FOREIGN PATENT DOCUMENTS

| CN | 205856095 U | 1/2017 |
| CN | 207961607 U | 10/2018 |

OTHER PUBLICATIONS

International Search Report with English Translation, cited in PCT/CN2019/070650 dated Mar. 25, 2019, 6 pages.
Written Opinion with English Translation, cited in PCT/CN2019/070650 dated Mar. 25, 2019, 9 pages.

* cited by examiner

FAUCET CONFIGURED TO DISCHARGE OZONE WATER

FIELD OF THE DISCLOSURE

The present disclosure relates to a field of faucets, in particular relates to a faucet.

BACKGROUND OF THE DISCLOSURE

Existing faucets that can provide ozone water. For example, Chinese Patent CN103987664B discloses a spout, a fluid supply passage, a first valve, and a water processing assembly. The fluid supply passage is fluidly connected to the spout. The first valve is connected to the fluid supply passage and the spout. The water processing assembly comprises a first water processing valve, a second water processing valve, a first flow passage, a second flow passage, and an electrolytic ozone generator. The first water processing valve is fluidly connected to the spout. The second water processing valve is disposed away from the first water processing valve and is fluidly connected to the spout. The first flow passage is connected to the first water processing valve through fluid interaction. The second flow passage is connected to the second water processing valve through fluid interaction. The electrolytic ozone generator is connected to the second flow passage through fluid interaction, and the faucet is configured to selectively control fluid to flow through one of the first flow passage or the second flow passage. Further, when in the first flow passage, the fluid is separated from the electrolytic ozone generator and flows through the first water processing valve. When in the second flow passage, the fluid flows through the second water processing valve and the electrolytic ozone generator. Mixed water yielded from mixing cold water and hot water is divided into two passages. Ozone is added to the mixed water flowing through a first passage by the electrolytic ozone generator, the water having ozone mixed therein is mixed again with the mixed water flowing through a second passage, and then the mixed water flows out of the spout. Therefore, the following deficiencies exist: first, a temperature of the mixed water is high, which reduces a concentration of the ozone after the ozone is added and results in less effective in sterilization; second, the ozone water is mixed again with the mixed water flowing through the second passage to further reduce the concentration of the ozone and increase a complexity of the passages.

BRIEF SUMMARY OF THE DISCLOSURE

The present disclosure provides a faucet to solve deficiencies the faucet of the existing techniques.

In order to solve the aforementioned technical problems, a technical solution of the present disclosure is as follows.

A faucet comprises a faucet body, a water mixing valve mechanism, a water processor, a control switch, a processor, a control valve, and a detector. The faucet body comprises a faucet outlet, the water mixing valve mechanism comprises a cold water inlet connected to a cold water resource, a hot water inlet connected to a hot water resource, and a mixed water outlet. The water processor comprises a water processing passage and an ozone generator connected to the water processing passage. The control switch is electrically connected to the processor, and the processor is electrically connected to the ozone generator. The control valve is disposed between the cold water resource and an inlet of the water processing passage, the cold water resource, the control valve, and the water processing passage define a first water passage, the control switch is operated to control the control valve and the ozone generator to both be opened, and an outlet of the water processing passage is connected to the faucet outlet. The detector is disposed between the mixed water outlet of the water mixing valve mechanism and the inlet of the water processing passage to detect whether water is flowing through the detector, the cold water resource, the hot water resource, the cold water inlet, the hot water inlet, the mixed water outlet, and the water processing passage define a second water passage independent from the first water passage, and the processor is also electrically connected to the detector and the control valve to close the control valve and the ozone generator when the detector detects the water flowing through.

In a preferred embodiment, the faucet further comprises a cold water joint connected to the cold water resource, the cold water joint is connected to an inlet of the control valve and a water flowing pipe, and the water flowing pipe is connected to the cold water inlet of the water mixing valve mechanism.

In a preferred embodiment, the faucet further comprises a three-way joint, and three ports of the three-way joint are respectively connected to the cold water inlet, the inlet of the control valve, and the water flowing pipe.

In a preferred embodiment, the water mixing valve mechanism is disposed on the faucet body, the water mixing valve mechanism comprises a water mixing valve core and a handle, the water mixing valve core cooperates with the cold water inlet, the hot water inlet, and the mixed water outlet, and the handle drives the water mixing valve core.

In a preferred embodiment, the handle and the control switch are disposed on two sides of the faucet body.

In a preferred embodiment, the detector comprises a flow detector.

In a preferred embodiment, the faucet further comprises a control box, and the processor, the water processor, the control valve, and the detector are disposed in the control box.

In a preferred embodiment, the water processing passage comprises a water passing hole and a changed chamber disposed along a water flow direction, and a water passing area of the changed chamber is larger than a water passing area of the water passing hole. The faucet further comprises a suction passage, an inner port of the suction passage is disposed on an inner wall of the changed chamber, and the ozone generator is connected to the suction passage.

In a preferred embodiment, the faucet further comprises a light-emitting display, and the light-emitting display is electrically connected to the processor.

In a preferred embodiment, the faucet further comprises a power supply, and the power supply is electrically connected to the control valve, the processor, the ozone generator, and the detector.

In a preferred embodiment, the faucet outlet is connected to a water outlet hose, the water outlet hose is connected between the faucet outlet and the outlet of the water processing passage, and the faucet outlet is retractably connected to the faucet body.

Compared with existing techniques, the technical solution of the present disclosure has the following advantages.

A control valve and a detector are added. The processor closes the control valve and the ozone generator when the detector detects that water flowing through the detector, and the inlet of the water processing passage is connected to two water passages. Cool water flowing through the cold water resource and the control valve defines a first water passage and mixed water flowing through the mixed water outlet of the water mixing valve mechanism defines a second water passage. Therefore, the technical solution of the present disclosure overcomes the deficiencies of the existing techniques and provides the following technical effects. First, it ensures that the ozone water can be generated only when the cold water flows through the faucet, and the ordinary water can be generated only when the mixed water flows through. A water temperature (cold water) of the ozone water is low, a concentration of the ozone is high, the ozone stays in the water for a long time and is highly effective at sterilization and disinfection. Second, both the ordinary water and the ozone water flow through the water processing passage, but the ordinary water and the ozone water do not interfere with each other, will not mix, are independent from each other have a long service life, and a compact structure. Third, the control valve controls the first flow passage comprising the cold water resource and control valve, and the water mixing valve mechanism controls the second flow passage of the mixed water comprising the water outlet of the water mixing valve mechanism. The control of the first flow passage and the second flow passage are independent, the mechanism is simple, and the flow passages are simple.

The faucet further comprises the cold water joint connected to the cold water resource. The cold water joint is connected to the inlet of the control valve and the water flowing pipe. The water flowing pipe is connected to the cold water inlet of the water mixing valve mechanism. The arrangement is reasonable and the structure is compact.

The control switch is disposed on the faucet body, and the handle and the control switch are disposed on two sides of the faucet body. The appearance is beautiful and the user operation is in convenience.

The water processing passage comprises the water passing hole and the changed chamber disposed along the water flow direction. The water passing area of the changed chamber is larger than the water passing area of the water passing hole. The faucet further comprises a suction passage, the inner port of the suction passage is disposed on the inner wall of the changed chamber, and the ozone generator is connected to the suction passage. Air is naturally sucked in through a water flow to save an air pump and to reduce cost.

BRIEF DESCRIPTION OF THE DRAWING

The present disclosure will be further described with the combination of the accompanying embodiments and the accompanying drawings.

DETAILED DESCRIPTION OF THE EMBODIMENTS

Referring to FIGS. 1-11, a faucet comprises a faucet body 10, a water mixing valve mechanism 20, a water processor 30, a control switch 40, a processor 50, a control valve 60, a detector 70, a power supply 80, and a control box 90.

The faucet body 10 is connected to a faucet outlet 11, and the faucet outlet 11 is connected to a water outlet hose 12. The faucet body 10 comprises a through passage, and the faucet outlet 11 is disposed in a first port of the through passage. An end of the water outlet hose 12 passes through the first port of the through passage and extends out of a second port of the through passage. The faucet outlet 11 moves retractably relative to the faucet body 10, so that a user can pull out the faucet outlet 11 as desired.

Figure 1:
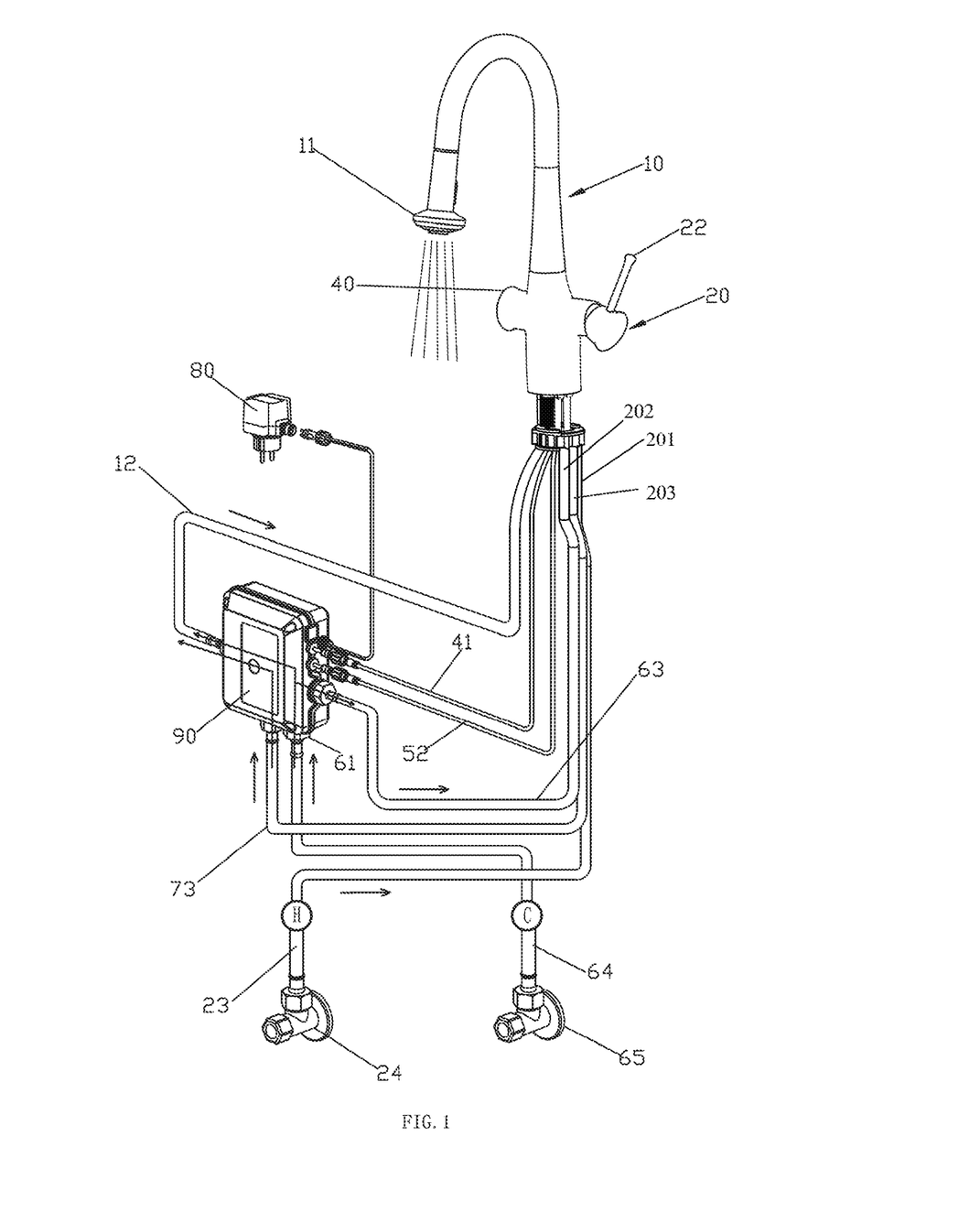
FIG. 1 illustrates a perspective view of a faucet of an embodiment.
Figure 2:
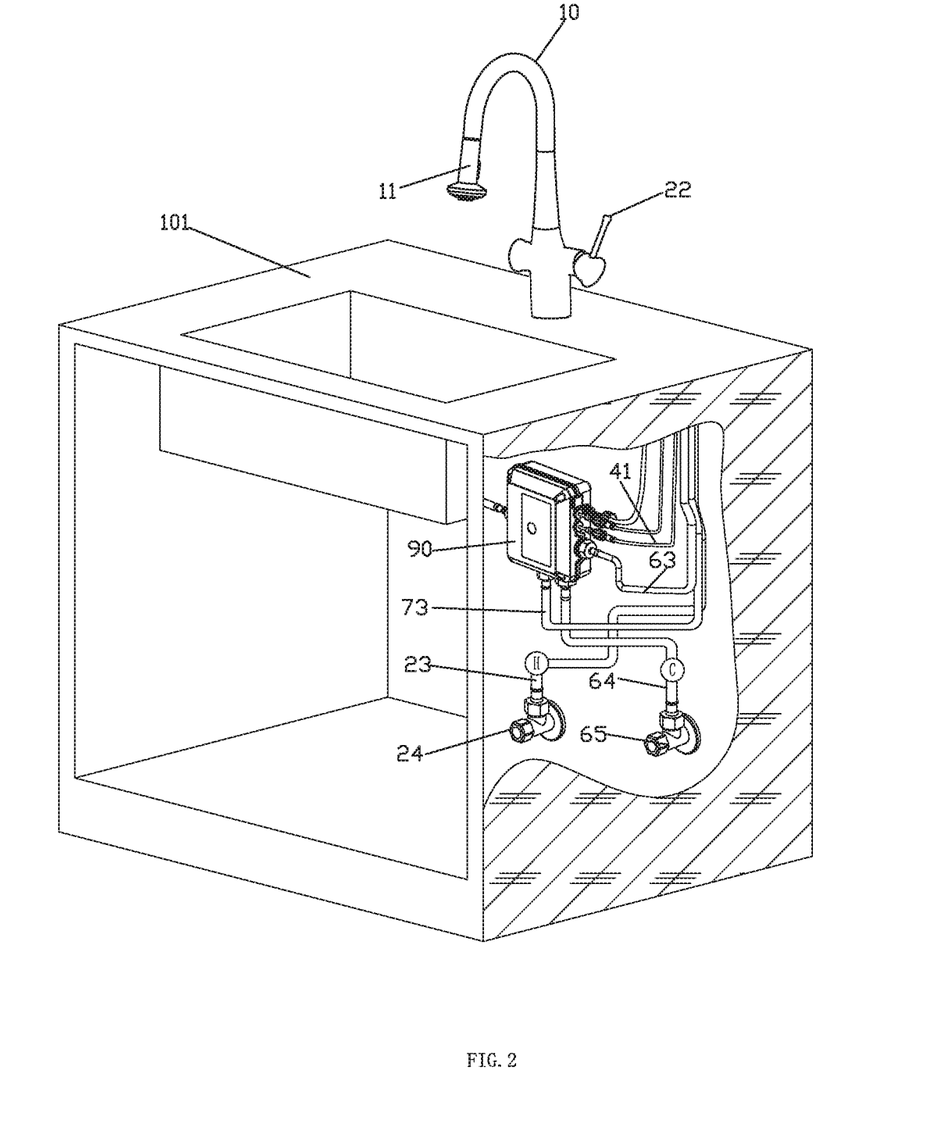
FIG. 2 illustrates a first in-use view of the faucet of the embodiment installed in a kitchen.
Figure 3:
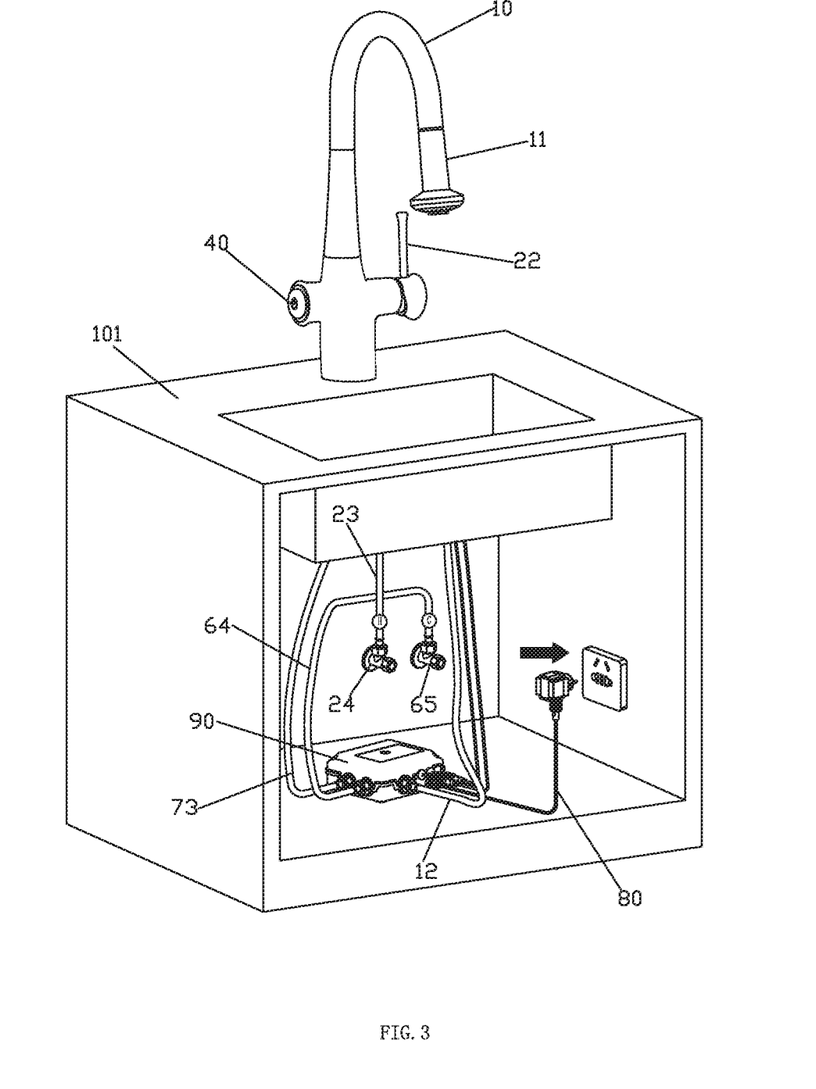
FIG. 3 illustrates a second in-use view of the faucet of the embodiment installed in the kitchen.
Figure 4:
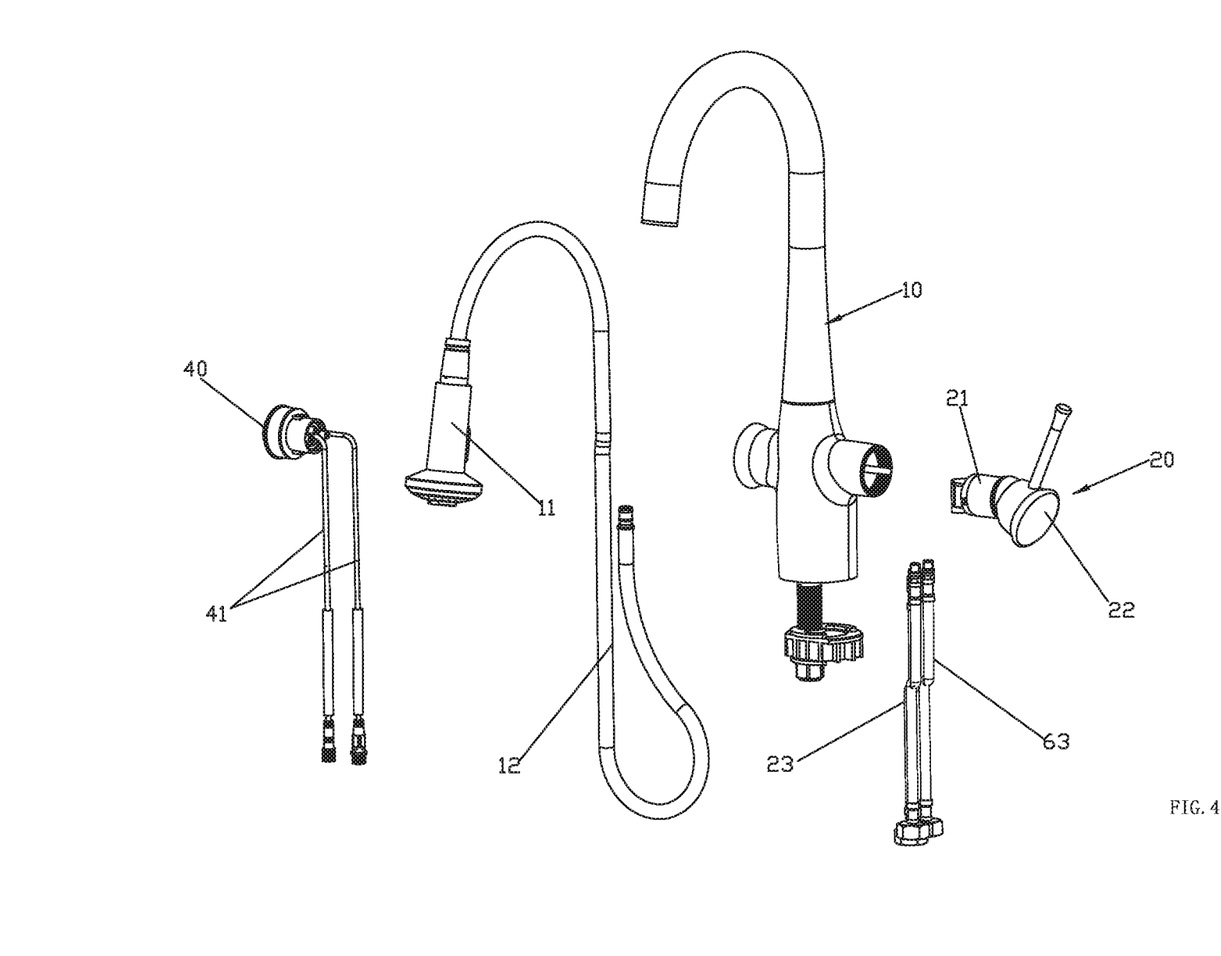
FIG. 4 illustrates an exploded perspective view of a faucet portion of the faucet of the embodiment.
Figure 11:
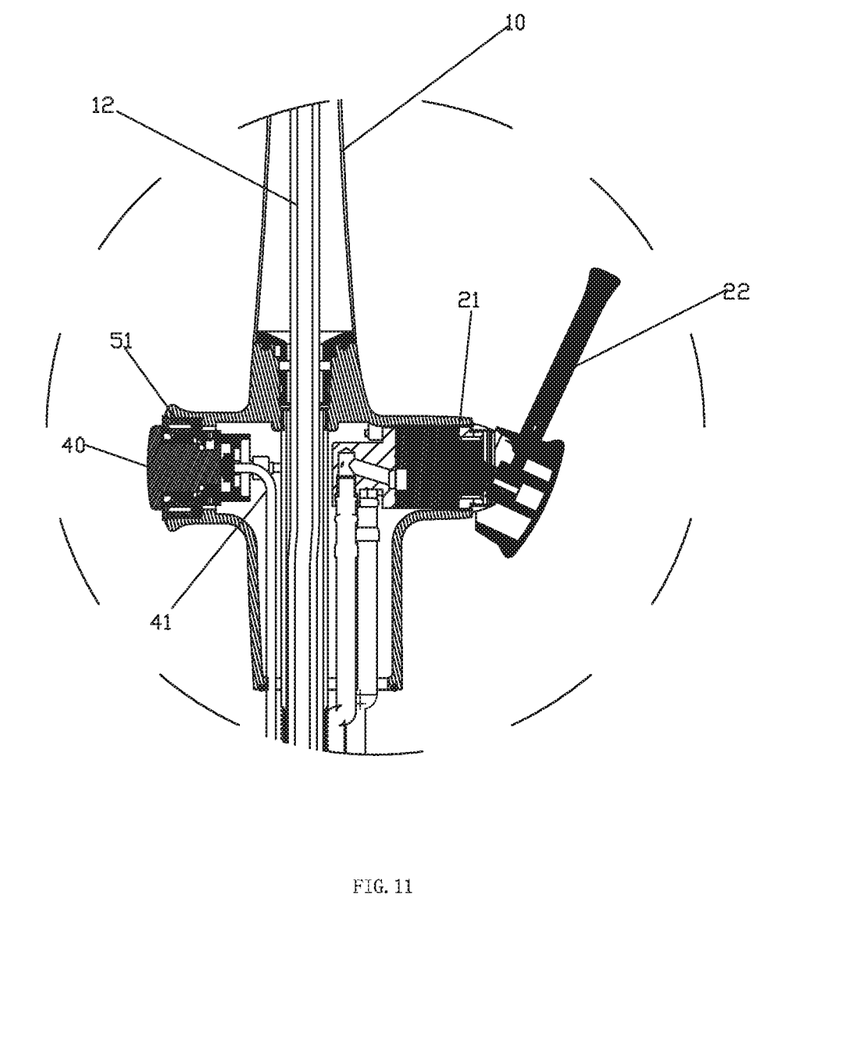
FIG. 11 illustrates a cross-sectional view of the faucet of the embodiment comprising the water mixing valve mechanism.

The water mixing valve mechanism 20 is disposed on the faucet body 10. The water mixing valve mechanism 20 is a mechanical water mixing valve, which is conventional. Referring to FIGS. 4 and 11, a specific structure of the water mixing valve mechanism 20 comprises a water mixing valve core 21 and a handle 22. The water mixing valve mechanism 20 comprises a cold water inlet 202 and a hot water inlet 201, configured to be respectively connected to a cold water resource and a hot water resource, and a mixed water outlet 203. The water mixing valve core 21 cooperates with the cold water inlet, the hot water inlet, and the mixed water outlet, and the handle 22 drives the water mixing valve core 21 to rotate to change a proportion of water passing areas of the cold water inlet and the hot water inlet to adjust a temperature of mixed water. The water mixing valve mechanism 20 is connected to a joint 24 of the hot water resource through a hot water pipe 23.

The water processor 30 comprises a water processing passage 31 and an ozone generator 32 connected to the water processing passage 31. The water processing passage 31 comprises a water passing hole 311 and a changed chamber 312 disposed along a water flow direction, and a water passing area of the changed chamber is larger than a water passing area of the water passing hole. The water processing passage 31 further comprises a suction passage 33, and an inner port of the suction passage 33 is disposed on an inner wall of the changed chamber. The ozone generator 32 is connected to the suction passage 33. According to the Venturi principle, when the water flows from the water passing hole into the changed chamber, a negative pressure is generated, and air is sucked in from an outer side of the suction passage 33 (i.e., an upper side of the suction passage 33) due to the negative pressure. Preferably, the suction passage 33 comprises a check valve 34 configured to suck the air and prevent the water from leaking. When the ozone generator 32 is not operating, the air is sucked from the outer side, and the air is mixed with the water flowing through the water processing passage 31 to generate the ordinary water. When the ozone generator 32 is operating, the air is sucked from the outer side, and the ozone generator 32 generates ozone from oxygen in the air due to a discharge of highvoltage corona, and the ozone is mixed with the water flowing through the water processing passage 31 to generate ozone water. As desired, an end of the suction passage 33 can be also disposed with a second check valve to prevent ozone from leaking out through the second check valve when the ozone generator 32 is operating.

The detector 70 determines whether water is flowing through the detector 70. For example, the detector 70 comprises a flow detector (a flow meter), such as a conventional flow meter. For example, the detector 70 comprises a flow sensor 71 and a flow meter rotor 72 connected to the flow sensor 71. The water flows through the detector 70 to drive the flow meter rotor 72 to rotate, and the flow sensor 71 is connected to the flow meter rotor 72 to determine a flow rate due to a rotation speed of the flow meter rotor 72. When the flow rate is non-zero, the water is flowing through the detector 70. The detector 70 is disposed in a connecting base 74, and the mixed water flows into the water processing passage 31 through the connecting base 74.

The faucet further comprises a cold water joint 61, a three-way joint 62, and a water flowing pipe 63. The cold water joint 61 is connected to the cold water resource. The cold water joint 61 is connected to a joint 65 of the cold water resource through a cold water pipe 64 to be connected to the cold water resource. Three ports of the three-way joint 62 are connected to the cold water joint 61, an inlet 66 of the control valve 60, and the water flowing pipe 63, and the water flowing pipe 63 is also connected to the cold water inlet of the water mixing valve mechanism 20. An inlet of the water processing passage 31 is connected to an outlet of the control valve 60, the inlet of the water processing passage 31 is also connected to the mixed water outlet of the water mixing valve mechanism 20 through the detector 70, and a mixing water pipe 73 is disposed between the mixed water outlet of the water mixing valve mechanism 20 and the detector 70. An outlet of the water processing passage 31 is connected to the faucet outlet 11 of the faucet body 10, such as an end port of the water outlet hose 12. For example, the control valve 60 is an electromagnetic valve.

In some embodiments, the connecting base 74 and the three-way joint 62 are integrally molded and the connecting base 74 comprises a cold water passage 67. The connecting base 74 comprises a joint 75 for the mixing water pipe 73 and a joint 76 for the water processing passage 31. The detector 70 is disposed in the connecting base 74 and is disposed above the joint 75 for the mixing water pipe 73.

The control switch 40 is disposed on the faucet body 10, and the handle 22 and the control switch 40 are disposed on two sides of the faucet body 10.

The processor 50 is electrically connected to the control switch 40, the detector 70, the control valve 60, and the ozone generator 32, and the control valve 60 and the ozone generator 32 are closed when the detector 70 detects the water flowing through the detector 70. The control switch 40 is electrically connected to the processor 50 through a first signal line 41.

The processor 50, the water processor 30, the control valve 60, and the detector 70 are all disposed in a control box 90, and the cold water joint 61 is disposed on the control box 90.

The power supply 80 is electrically connected to the control valve 60, the processor 50, the ozone generator 32, and the detector 70. The power supply 80 can be a battery or a plug. For example, the plug is connected to an external socket to supply power.

As required, the faucet also comprises a light-emitting display 51. The light-emitting display 51 is electrically connected to the processor 50 to present a first state when the ozone generator 32 is in operation. For example, the light-emitting display 51 is electrically connected to the processor 50 through a second signal line 52. The light-emitting display 51 presents a second state when the ozone generator 32 is not in operation. For example, when the ozone generator 32 is in operation, a light lights up or a blue light lights up, and when the ozone generator 32 is not in operation, the light-emitting display 51 does not light up or a red light lights up. For example, the light-emitting display 51 is also disposed on the faucet body 10.

Figure 6:
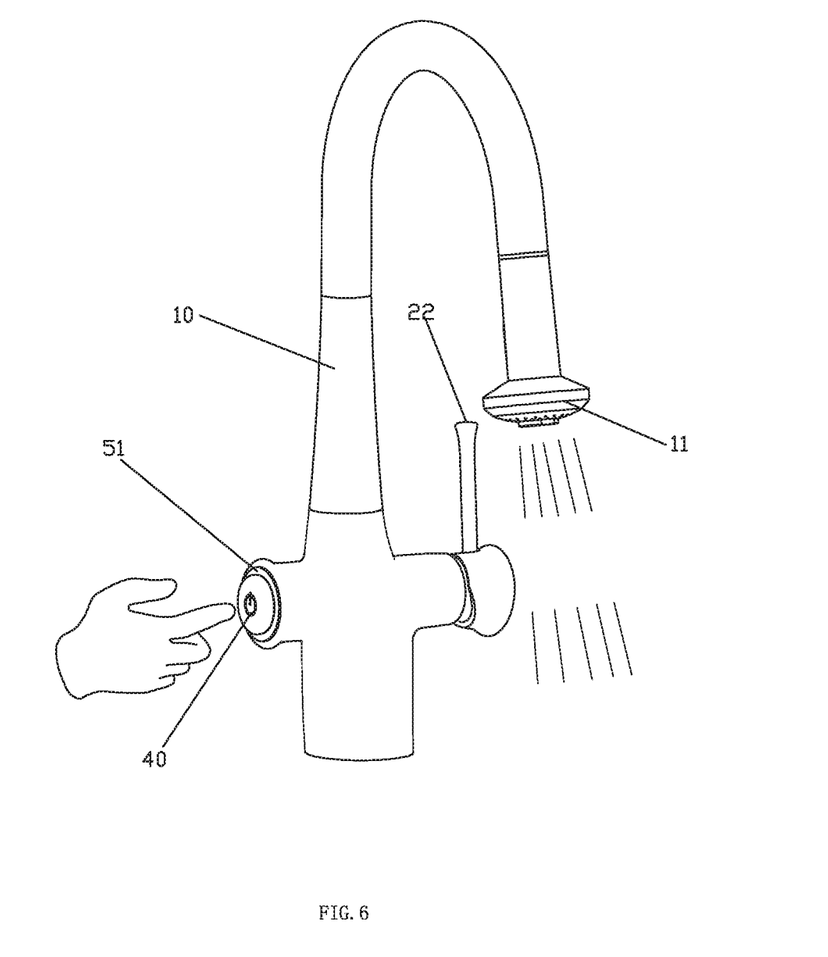
FIG. 6 illustrates a perspective view of the faucet of the embodiment when a control switch is pressed.
Figure 7:
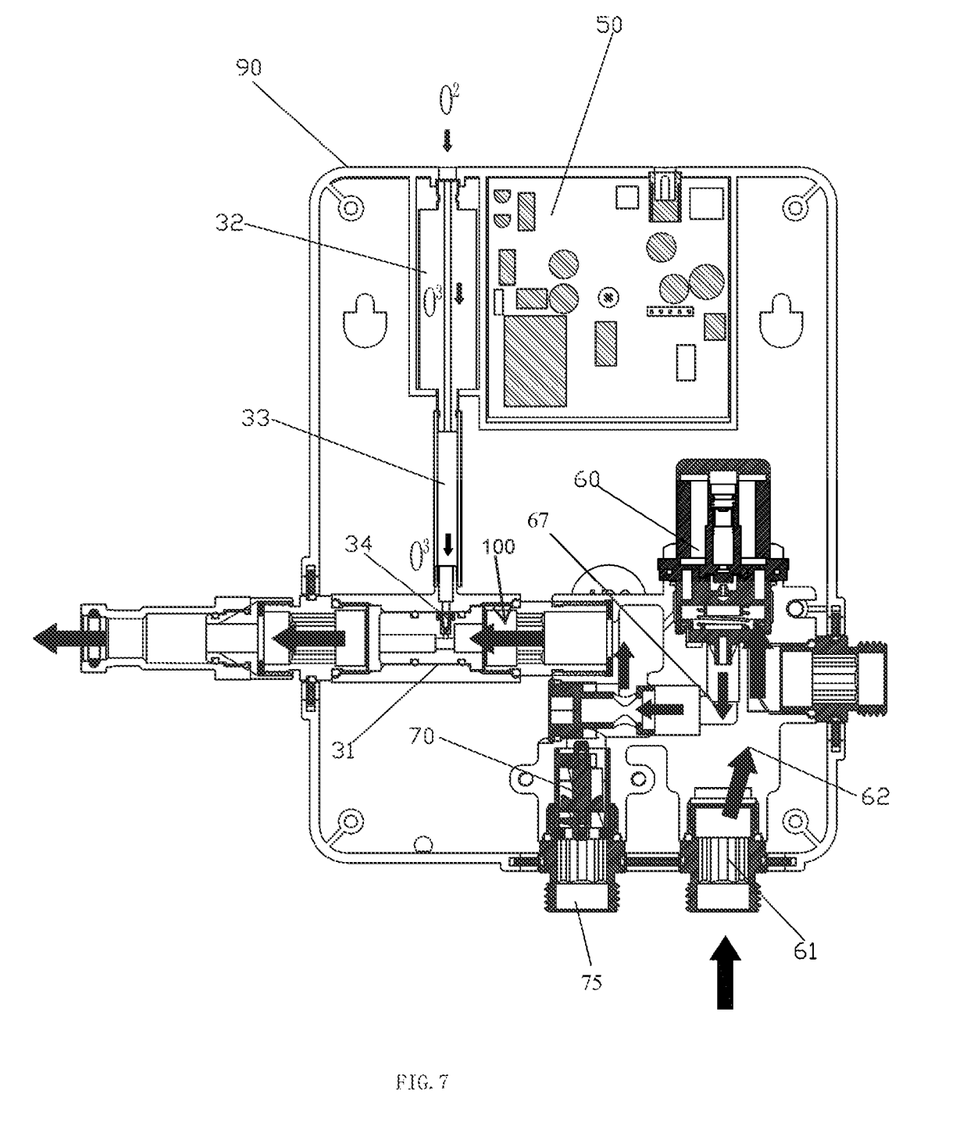
FIG. 7 illustrates a schematic view of the faucet of the embodiment when ozone water flows out of the control box.

The working principle and water passages of the faucet of the embodiment are further described as follows:

Ozone water mode: referring to FIGS. 6 and 7, at this time, the water mixing valve mechanism 20 is closed. Because the water mixing valve mechanism 20 is closed, no water flows through the water flowing pipe 63 (the cold water inlet of the water mixing valve mechanism 20 is closed), and no water flows through the detector 70. The control switch 40 is operated to open the control valve 60 and the ozone generator 32, and cold water from the joint 65 of the cold water resource flows through the cold water pipe 64, the cold water joint 61, the three-way joint 62, and the control valve 60 to enter into the inlet of the water processing passage 31. The cold water resource, the control valve 60, and the water processing passage 31 define a first water passage 100. The water processing passage 31 sucks the ozone generated by the ozone generator 32 through the suction passage 33, and the ozone and the cold water are mixed to obtain the ozone water. The ozone water flows through the outlet of the water processing passage 31, the water outlet hose 12, and the faucet outlet 11 to discharge the ozone water. At this time, the light-emitting display 51 emits the blue light.

At this time, the control valve 60 disposed in the three-way joint 62 is opened, and the cold water passage 67 is open.

Figure 8:
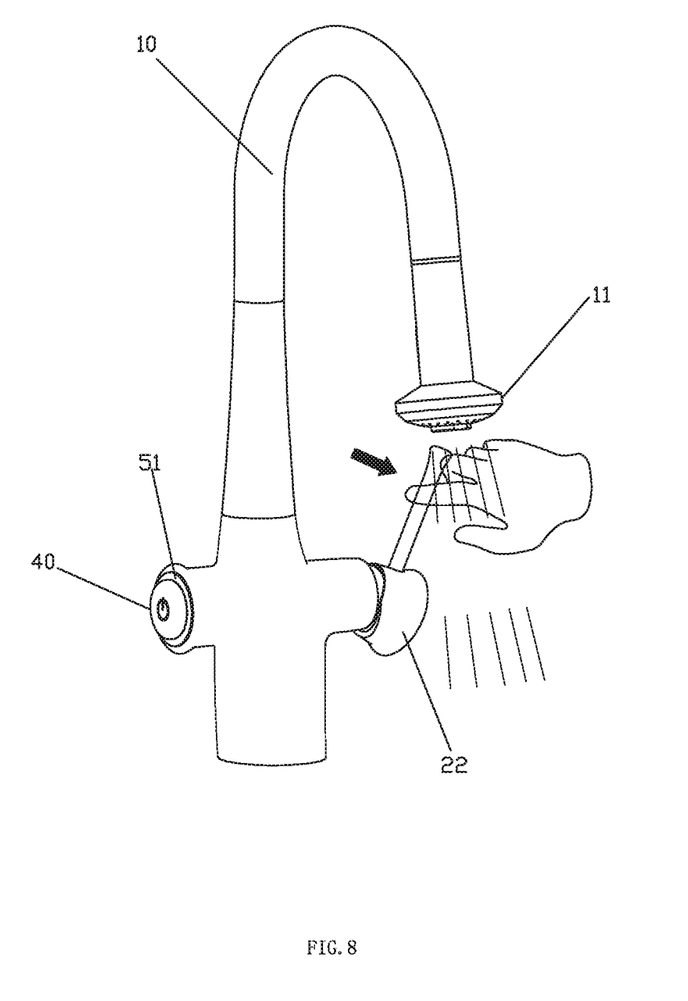
FIG. 8 illustrates a perspective view of the faucet of the embodiment when a water mixing valve mechanism is opened.
Figure 9:
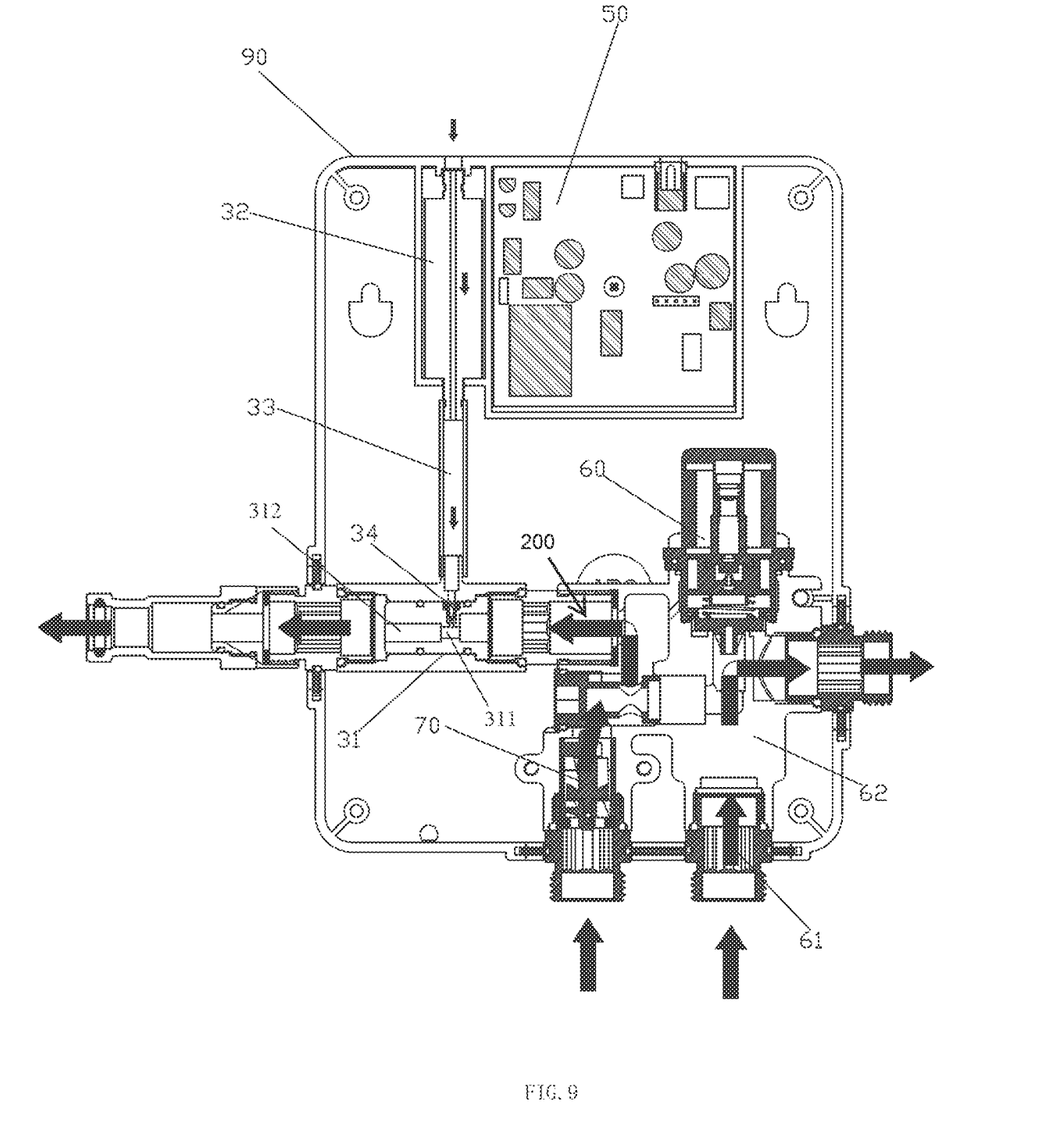
FIG. 9 illustrates a schematic view of the faucet of the embodiment when ordinary water flows out of the control box.

Ordinary water mode: referring to FIGS. 8 and 9, at this time, the control switch 40 is not opened, and the control valve 60 and the ozone generator 32 are both closed. The water temperature is controlled by the handle 22. The cold water from the joint 65 of the cold water resource flows through the cold water pipe 64, the cold water joint 61, the three-way joint 62, and the water flowing pipe 63 to enter into the cold water inlet of the water mixing valve mechanism 20, and hot water from the joint 24 of the hot water resource flows through the hot water pipe 23 to enter into the hot water inlet of the water mixing valve mechanism 20. Mixed water from the mixed water outlet of the water mixing valve mechanism 20 flows through the mixing water pipe 73, the detector 70, and the inlet of the water processing passage 31 to enter into the water processing passage 31. The cold water resource, the hot water resource, the cold water inlet, the hot water inlet, the mixed water outlet, and the water processing passage 31 define a second water passage 200 independent from the first water passage 100. The mixed water and the air sucked into the water processing passage 31 are mixed in the water processing passage 31 to obtain the ordinary water, and the ordinary water from the outlet of the water processing passage 31 flows through the water outlet hose 12 and the faucet outlet 11 to discharge the ordinary water. The light-emitting display 51 is turned off at this time.

At this time, the control valve 60 disposed in the three-way joint 62 is closed, and the cold water passage 67 is closed. Therefore, two independent passages are defined.

Figure 10:
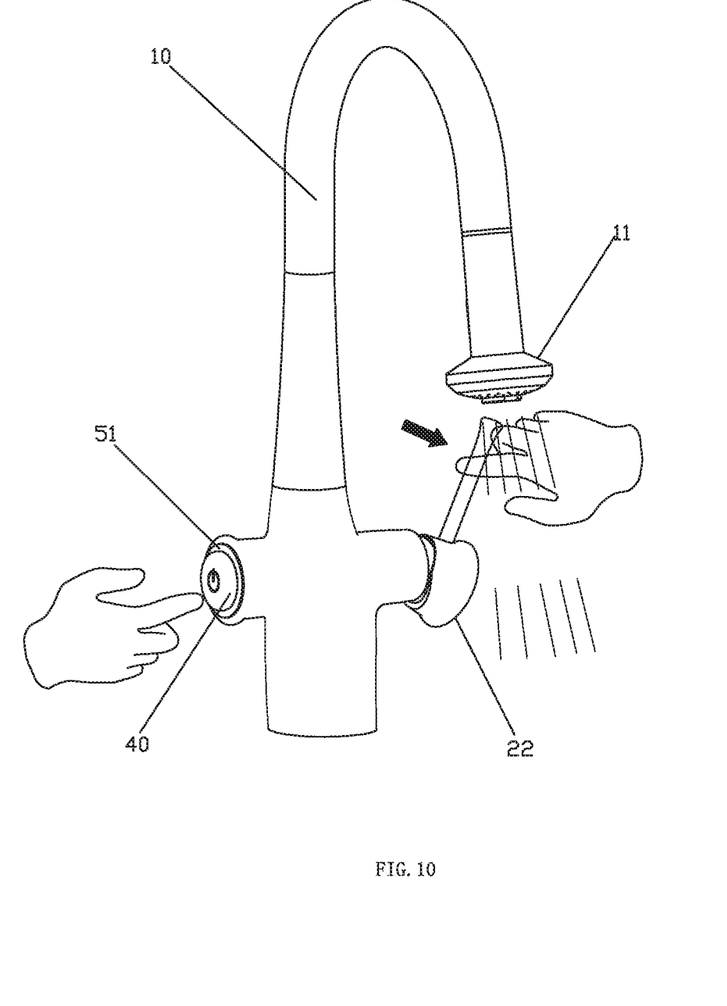
FIG. 10 illustrates a perspective view of the faucet of the embodiment when the water mixing valve mechanism is opened and the control switch is pressed.

Misoperation mode: referring to FIGS. 9 and 10, the control switch 40 is operated to be opened, and the water temperature is controlled by the handle 22. The cold water from the joint 65 of the cold water resource flows through the cold water pipe 64, the cold water joint 61, the three-way joint 62, and the water flowing pipe 63 to enter into the cold water inlet of the water mixing valve mechanism 20, and the hot water from the joint 24 of the hot water resource flows through the hot water pipe 23 into the hot water inlet of the water mixing valve mechanism 20. Mixed water from the mixed water outlet of the water mixing valve mechanism 20 flows through the mixing water pipe 73, the detector 70, and the inlet of the water processing passage 31 to enter into the water processing passage 31. At this time, the detector 70 detects the water flowing through the detector so as to close the control valve 60 and the ozone generator 32. Moreover, the mixed water is mixed with the air sucked in the water processing passage 31 to obtain the ordinary water, and the ordinary water from the outlet of the water processing passage 31 flows through the water outlet hose 12 to the faucet outlet 11 to discharge the ordinary water. At this time, the light-emitting display 51 emits the red light.

Figure 5:
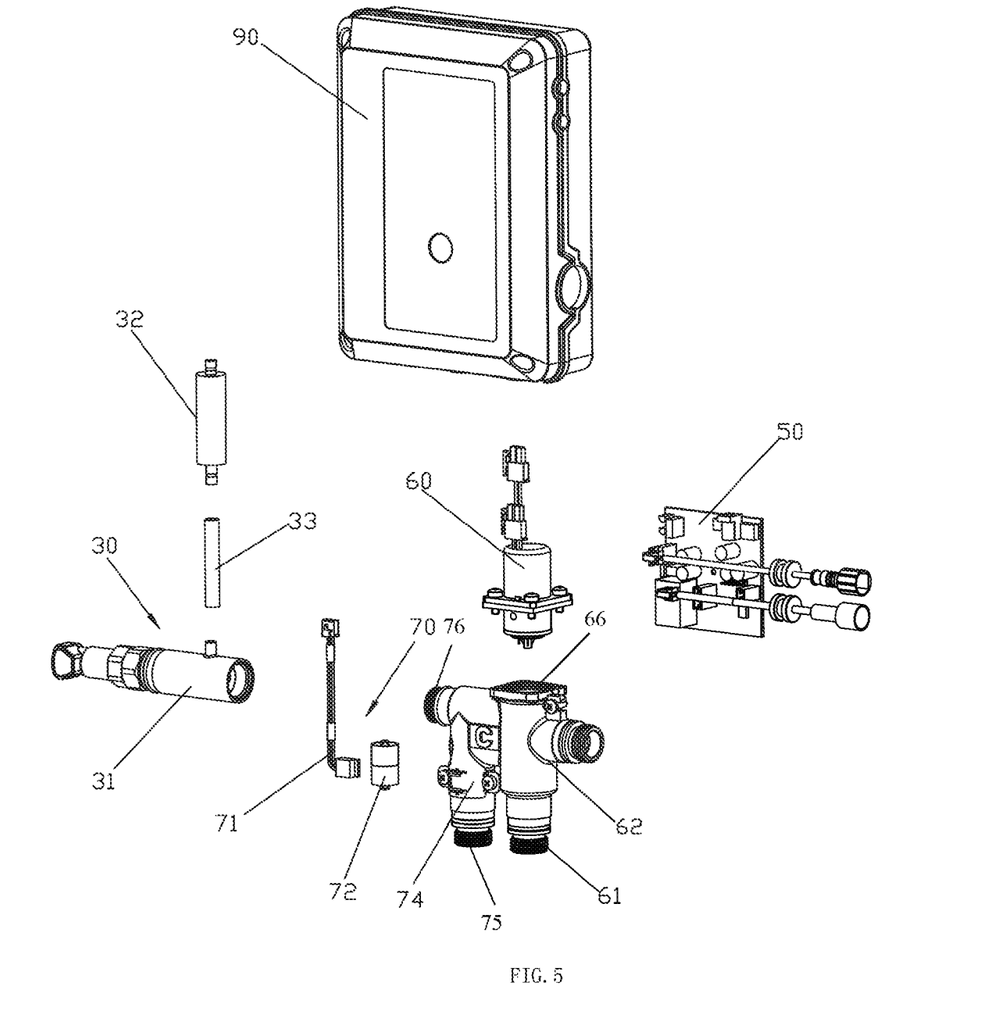
FIG. 5 illustrates an exploded perspective view of a control box portion of the faucet of the embodiment.

Referring to FIG. 4, in this embodiment, the faucet body 10 is disposed on a kitchen countertop 101. A portion of the faucet disposed above the kitchen countertop 101 is a faucet portion. Referring to FIG. 5, a portion of the faucet disposed under the kitchen countertop 101 is a control box portion.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

INDUSTRIAL APPLICABILITY

The present disclosure discloses a faucet to ensure that the ozone water can be generated only when the cold water flows through, and only the ordinary water can be generated when the mixed water flows through. A water temperature (cold water) of the ozone water is low, a concentration of the ozone is high, the ozone stays in the water for a long time and is highly effective at sterilization and disinfection. A range of application is wide, and an industrial applicability is good.

What is claimed is:

1. A faucet, comprising:
a faucet body,
a water mixing valve mechanism,
a water processor,
a control switch,
a processor,
a control valve, and
a detector, wherein:
  the faucet body comprises a faucet outlet,
  the water mixing valve mechanism comprises a cold water inlet connected to a cold water resource, a hot water inlet connected to a hot water resource, and a mixed water outlet,
  the water processor comprises a water processing passage and an ozone generator connected to the water processing passage,
  the control switch is electrically connected to the processor,
  the processor is electrically connected to the ozone generator,
  the control valve is disposed between the cold water resource and an inlet of the water processing passage,
  the cold water resource, the control valve, and the water processing passage define a first water passage independent from the water mixing valve mechanism,
  the control switch is operated to control the control valve and the ozone generator to both be opened to enable ozone generated by the ozone generator and cold water from the cold water resource to be mixed to generate ozone water,
  an outlet of the water processing passage is connected to the faucet outlet,
  the detector is independent from the first water passage and is disposed between the mixed water outlet of the water mixing valve mechanism and the inlet of the water processing passage to detect whether water is flowing through the detector,
  the cold water resource, the hot water resource, the cold water inlet, the hot water inlet, the mixed water outlet, the detector, and the water processing passage define a second water passage independent from the first water passage,
  the control valve is independent from the second passage, and
  the processor is also electrically connected to the detector and the control valve to close the control valve and the ozone generator when the detector detects the water flowing through the detector.

2. The faucet according to claim 1, further comprising:
a cold water joint connected to the cold water resource, wherein:
  the cold water joint is connected to an inlet of the control valve and a water flowing pipe, and
  the water flowing pipe is connected to the cold water inlet of the water mixing valve mechanism.

3. The faucet according to claim 2, further comprising:
a three-way joint, wherein:
  three ports of the three-way joint are respectively connected to the cold water inlet, the inlet of the control valve, and the water flowing pipe.

4. The faucet according to claim 1, wherein:
the water mixing valve mechanism is disposed on the faucet body,
the water mixing valve mechanism comprises a water mixing valve core and a handle,
the water mixing valve core cooperates with the cold water inlet, the hot water inlet, and the mixed water outlet, and
the handle drives the water mixing valve core.

5. The faucet according to claim 4, wherein the handle and the control switch are disposed on two sides of the faucet body.

6. The faucet according to claim 1, wherein the detector comprises a flow detector.

7. The faucet according to claim 1, further comprising:
a control box, wherein:
  the processor, the water processor, the control valve, and the detector are disposed in the control box.

8. The faucet according to claim 1, further comprising:
a suction passage, wherein:
  the water processing passage comprises a water passing hole and a changed chamber disposed along a water flow direction,
  a water passing area of the changed chamber is larger than a water passing area of the water passing hole, an inner port of the suction passage is disposed on an inner wall of the changed chamber, and the ozone generator is connected to the suction passage.

9. The faucet according to claim 1, further comprising:

a light-emitting display, wherein:

the light-emitting display is electrically connected to the processor.

10. The faucet according to claim 1, further comprising:

a power supply, wherein:

the power supply is electrically connected to the control valve, the processor, the ozone generator, and the detector.

11. The faucet according to claim 1, wherein:

the faucet outlet is connected to a water outlet hose, the water outlet hose is connected between the faucet outlet and the outlet of the water processing passage, and the faucet outlet is retractably connected to the faucet body.

12. The faucet according to claim 1, further comprising:

a connecting base, wherein:

the connecting base is integrally molded with a three-way joint, an inner side of the connecting base comprises a cold water passage, the connecting base comprises a joint for a mixing water pipe and a joint for the water processing passage, the detector is disposed in the connecting base, and the detector is disposed above the joint for the mixing water pipe.

13. The faucet according to claim 1, wherein:

the faucet operates in an ozone water mode and an ordinary water mode, when no water flows through the detector, the faucet is in the ozone water mode:

the water mixing valve mechanism is closed, the cold water from a joint of the cold water resource flows through a cold water pipe, a cold water joint, a three-way joint, and the control valve to enter into the inlet of the water processing passage, the water processing passage sucks the ozone generated by the ozone generator through a suction passage, the ozone water flows through the outlet of the water processing passage, an outlet hose, and the faucet outlet to discharge the ozone water, the control valve, disposed in the three-way joint, is opened to control the control valve and the ozone generator to both be opened to enable the ozone and the cold water to be mixed to generate the ozone water, and a cold water passage is opened, and when the detector detects the water flowing through the detector, the faucet is in the ordinary water mode:

the control switch is closed, the control valve and the ozone generator are closed, a handle of the faucet is operated to adjust water temperature, the cold water from the joint of the cold water resource flows through the cold water pipe, the cold water joint, the three-way joint, and a water flowing pipe to enter into the cold water inlet of the water mixing valve mechanism, hot water from a joint of the hot water resource flows through a hot water pipe to enter into the hot water inlet of the water mixing valve mechanism, mixed water from the mixed water outlet of the water mixing valve mechanism flows through a mixing water pipe, the detector, and the inlet of the water processing passage to enter into the water processing passage, the mixed water and air sucked into the water processing passage are mixed to generate ordinary water in the water processing passage, the ordinary water flows through the outlet of the water processing passage, the outlet hose and the faucet outlet to discharge the ordinary water, and the control valve, disposed in the three-way joint, is closed and the cold water passage is closed to define two independent passages.

* * * * *